(12) United States Patent
Ellmann et al.

(10) Patent No.: US 7,835,830 B2
(45) Date of Patent: Nov. 16, 2010

(54) DEVICE FOR THE GENERATION OF RELIABLE STATUS SIGNALS OF A VEHICLE THAT IS MOVABLE ALONG A GIVEN PATH OF TRAVEL

(75) Inventors: Siegfried Ellmann, Aschheim (DE); Freidrich Loeser, Riemerling (DE)

(73) Assignee: ThyssenKrupp Transrapid GmbH, Kassel (DE)

( * ) Notice: Subject to any disclaimer, the term of this patent is extended or adjusted under 35 U.S.C. 154(b) by 984 days.

(21) Appl. No.: 10/593,912

(22) PCT Filed: Mar. 22, 2005

(86) PCT No.: PCT/DE2005/000523
§ 371 (c)(1),
(2), (4) Date: Sep. 22, 2006

(87) PCT Pub. No.: WO2005/095145
PCT Pub. Date: Oct. 13, 2005

(65) Prior Publication Data
US 2007/0192000 A1 Aug. 16, 2007

(30) Foreign Application Priority Data
Mar. 26, 2004 (DE) .................. 10 2004 015 496

(51) Int. Cl.
*G05D 1/00* (2006.01)
*G05D 3/00* (2006.01)
(52) U.S. Cl. .................. 701/19; 701/20; 701/24; 701/119; 246/167 R
(58) Field of Classification Search ............ 701/19–20, 701/23–24, 29, 119; 104/284, 281, 88.04; 340/933; 246/122 R, 167 R; 324/207.16
See application file for complete search history.

(56) References Cited

U.S. PATENT DOCUMENTS 4,603,640 A * 8/1986 Miller et al. ............. 104/282

(Continued)

FOREIGN PATENT DOCUMENTS

DE 31 48 007 6/1983

(Continued)

OTHER PUBLICATIONS

Development of Railway Signaling System based on Network Technology; Hirano, Y.; Kato, T.; Kunifuji, T.; Hattori, T.; Systems, Man and Cybernetics, 2005 IEEE International Conference on; vol. 2; Digital Object Identifier: 10.1109/ICSMC.2005.1571335; Publication Year: 2005 , pp. 1353-1358.*

(Continued)

*Primary Examiner*—Cuong H Nguyen
(74) *Attorney, Agent, or Firm*—Michael J. Striker

(57) ABSTRACT

A device for generating safe status signals of a vehicle (9) that is movable along a given guideway includes data transmitters disposed along said guideway and provided with data (28a, 28b), data acquisition units (21) mounted on the vehicle and used for scanning the data transmitters and for supplying data signals, and an evaluation device (24) connected to said data acquisition units (21) evaluating the data signals. At least two of the data acquisition units (21) are provided which are connected to the evaluation device (24), and the evaluation device (24) has an output (25) for delivering safe status signals when and as long as at least two data acquisition units (21) supply matching data.

12 Claims, 3 Drawing Sheets

U.S. PATENT DOCUMENTS

| | | | | |
|---|---|---|---|---|
| 4,796,206 | A | * | 1/1989 | Boscove et al. ............... 701/99 |
| 5,467,945 | A | | 11/1995 | Kubota et al. |
| 5,729,452 | A | * | 3/1998 | Smith et al. .................... 701/29 |
| 5,835,871 | A | * | 11/1998 | Smith et al. .................... 701/29 |
| 5,941,918 | A | * | 8/1999 | Blosser ........................ 701/29 |
| 5,983,161 | A | * | 11/1999 | Lemelson et al. ........... 701/301 |
| 6,029,104 | A | * | 2/2000 | Kim ............................ 701/20 |
| 6,204,778 | B1 | * | 3/2001 | Bergan et al. ............... 340/936 |
| 6,580,374 | B2 | * | 6/2003 | Schrage ...................... 340/933 |
| 6,707,391 | B1 | * | 3/2004 | Monroe ...................... 340/901 |
| 6,708,038 | B1 | * | 3/2004 | Laguer-Diaz et al. ....... 455/462 |
| 6,947,817 | B2 | * | 9/2005 | Diem .......................... 701/34 |
| 6,985,827 | B2 | * | 1/2006 | Williams et al. ............ 702/142 |
| 7,039,515 | B2 | * | 5/2006 | Eich et al. .................... 701/51 |
| 7,688,222 | B2 | * | 3/2010 | Peddie et al. ............... 340/905 |

FOREIGN PATENT DOCUMENTS

| | | |
|---|---|---|
| DE | 33 03 961 | 8/1983 |
| DE | 102 32 720 | 2/2004 |
| JP | 08011721 | 1/1996 |
| WO | 91/09750 | 7/1991 |

OTHER PUBLICATIONS

Synchronizable error-control coding for railway track circuit data transmission; Hill, R.J.; Weedon, D.N.; Vehicular Technology Conference, 1987. 37th IEEE; vol. 37; Publication Year: 1987, pp. 206-213.*

Centralized and decentralized policies for the containment of moving source in 2D diffusion processes using sensor/actuator network; Demetriou, M.A.; American Control Conference, 2009. ACC '09.; Digital Object Identifier: 10.1109/ACC.2009.5160089 Publication Year: 2009, pp. 127-132.*

A quench management system for testing superconducting magnets; Orris, D.F.; Carcagno, R.; Feher, S.; Lamm, M.J.; Nogiec, J.; Schlabach, P.; Tartaglia, M.; Tompkins, J.C.; Applied Superconductivity, IEEE Transactions on; vol. 13, Issue: 2, Part: 2; Digital Object Identifier: 10.1109/TASC.2003.812872; Publication Year: 2003, pp. 1700-1703.*

Simulator for studying traffic dynamics of automated guideway transit system; Araya, S.; Vehicular Technology Conference, 1981. 31st IEEE; vol. 31; Publication Year: 1981, pp. 331-332.*

A Study on Predicting Hazard Factors for Safe Driving; Takahashi, H.; Ukishima, D.; Kawamoto, K.; Hirota, K.; Industrial Electronics, IEEE Transactions on; vol. 54, Issue: 2; Digital Object Identifier: 10.1109/TIE.2007.891651 Publication Year: 2007, pp. 781-789.*

F. Schuenemann: "Die Betriebsleittechnik Des . . . " Zevrail Glasers Annalen—Sonderheft Transrapid 2003 (With Eng. Asbtract).

* cited by examiner

FAILURE COMBINATION

| 28a | 28b | 21a | 21b | 21c | 21d | 21e | 21f | 21g | 21h | LOCATION DETERMINATION |
|---|---|---|---|---|---|---|---|---|---|---|
| X |   | X | X | X | X |   |   |   |   | SAFE |
|   | X |   |   |   |   | X | X | X | X | SAFE |
| X |   | X | X | X | X | X |   |   |   | SAFE |
| X |   | X | X | X | X | X | X |   |   | SAFE |
| X |   | X | X | X | X | X | X | X |   | NOT SAFE |
|   | X |   |   |   | X | X | X | X | X | SAFE |
|   | X |   |   | X | X | X | X | X | X | SAFE |
|   | X |   | X | X | X | X | X | X | X | NOT SAFE | x: FUNCTION FAILED

Fig. 4

DEVICE FOR THE GENERATION OF RELIABLE STATUS SIGNALS OF A VEHICLE THAT IS MOVABLE ALONG A GIVEN PATH OF TRAVEL

BACKGROUND OF THE INVENTION

The invention relates to a device for generating reliable status signals of a vehicle that is movable along a given path of travel.

With known devices of this kind (e.g. DE 33 03 961 C2), a position transmitter in form of a measuring strip is mounted on one side of a guideway destined for magnetic levitation vehicles, said measuring strip being provided for example with markings configured as slots which contain absolute information in encoded form on the location at which they are mounted. A data acquisition (detection) unit is provided at the vehicle by means of which the absolute location data are read-out. The read-out location data are for example transmitted in a wireless mode to a central vehicle and guideway control unit accommodated in a master control station.

Furthermore it is known for magnetic levitation vehicles driven by long-stator linear motors (DE 31 48 007 C2) to provide the vehicles with a data acquisition unit in form of a groove measuring (counting) unit connected to a meter and utilized to scan the grooves of the long-stator and to generate periodical signals fluctuating with the spacing (pitch) of the grooves. Though these signals are particularly utilized for producing an optimal phase relation between the long-stator and the vehicle, they may also serve to determine a relative location information by evaluating the counter reading. With known magnetic levitation railways, this is accomplished by resetting the groove counting meter from each read-out absolute location information back to zero so that the present counter reading always indicates the distance of the vehicle from the latest absolute location.

A disadvantage of the location identification as described hereinabove lies in the fact that it is not adequately reliable (safe), because the described data acquisition units, measuring facilities, measuring strips etc. as well as other components of the device described above may fail to work at any time due to a defect. But for controlling particularly a driverless vehicle like e.g. a magnetic levitation railway, safe data and information on the present location of the vehicle are of crucial importance. On the basis of this location information, the traveling speed and the stop of the vehicles at railway stations or, in case of a danger, at other preselected stopping points is adapted. The correctness and availability of the actual location information, therefore, sets the basis for a safe and secure operation control.

The same applies to the speed and direction signals generated in the vehicle. For example, these signals can be derived from the location information by permanently determining the number of long-stator grooves being passed by a vehicle per time unit and having a constant length or by determining by the aid of two data acquisition units mounted in staggered arrangement in the direction of travel the direction in which absolute location data mounted at the guideway are moved past the vehicle. If location data are not safe, the data on speed and direction are also not safe.

For standardization of terms, the signals of location, speed and direction are summarized hereinafter under the collective term "status signals".

SUMMARY OF THE INVENTION

Starting from the state of the art as outlined hereinabove, the technical problem underlying the present invention is to configure the device of the species designated further above in such a manner that it warrants the production of safe status signals even on occurrence of various possible disturbances and failures of the components involved.

The present invention bears the advantage that several data acquisition units are redundantly linked to each other and that status signals are issued by the evaluation device only if the data acquisition units furnish corresponding and matching data and information. The status signals can then be deemed as safe signals. This is valid regardless of whether these signals in a given case are position signals or speed signals or direction signals derived from location signals or in any other form.

Other advantageous features of the present invention become evident from the subclaims.

BRIEF DESCRIPTION OF THE DRAWINGS

The invention is explained in greater detail herein below, based on the drawings enclosed hereto and by means of an embodiment, wherein:

FIG. 4 in form of a table shows possible failure combinations in the location determination.

DETAILED DESCRIPTION OF THE PREFERRED EMBODIMENTS

The device according to the present invention is initially described in general by way of an example for generating reliable position signals for a track-bound vehicle and especially by way of an embodiment for a magnetic levitation railway with a synchronous long-stator linear motor. To those skilled in the art, however, it is self-evident that the device according to the present invention can also be applied in a diversified form in other track-bound vehicle systems, too.

Figure 1:
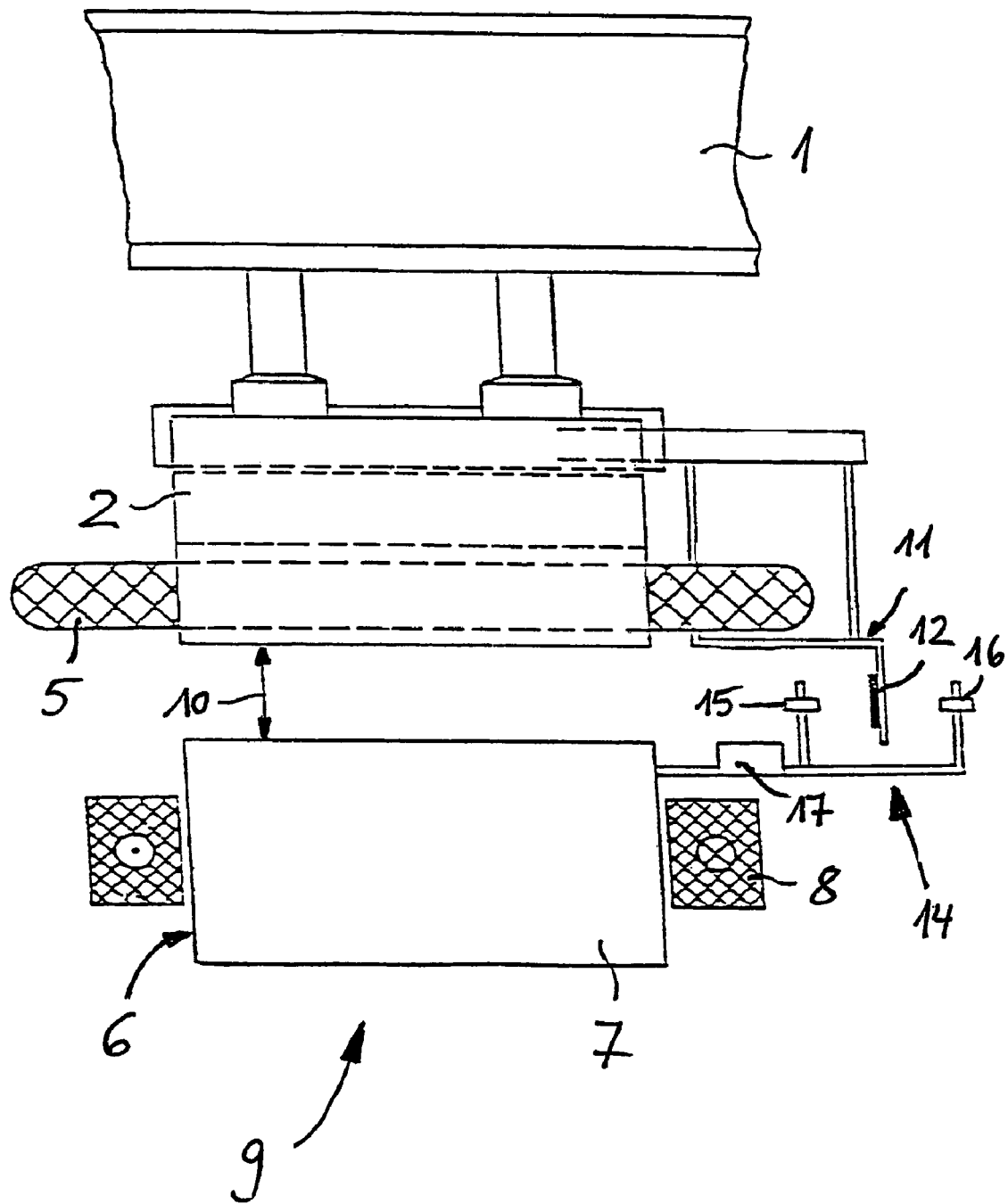
FIG. 1 schematically shows a vertical section through a magnetic levitation vehicle and a guideway.

According to FIG. 1, the magnetic levitation railway comprises a guideway 1 with a long-stator 2 of a long-stator motor being fastened thereto, said long-stator being formed of individual stator packs and extending in the direction of travel. At its underside, the long-stator 2 comprises grooves 3 (FIG. 2) and teeth 4 in alternating arrangement. Inserted into the grooves 3 is a three-phase alternating current winding 5 (FIG. 1) which is supplied with a three-phase current of a variable amplitude and frequency. The excitation field of the long-stator linear motor is generated by carrying magnets 6 which consist of cores 7 and windings 8 surrounding them, which are mounted to a vehicle 9 and which simultaneously serve for the "carrying" (levitation) function in order to provide a support gap 10 between the guideway 1 (and/or the long-stator 2) and the vehicle 9 (and/or the carrying magnets 6) said gap being is characteristic for the suspended status during operation.

Figure 2:
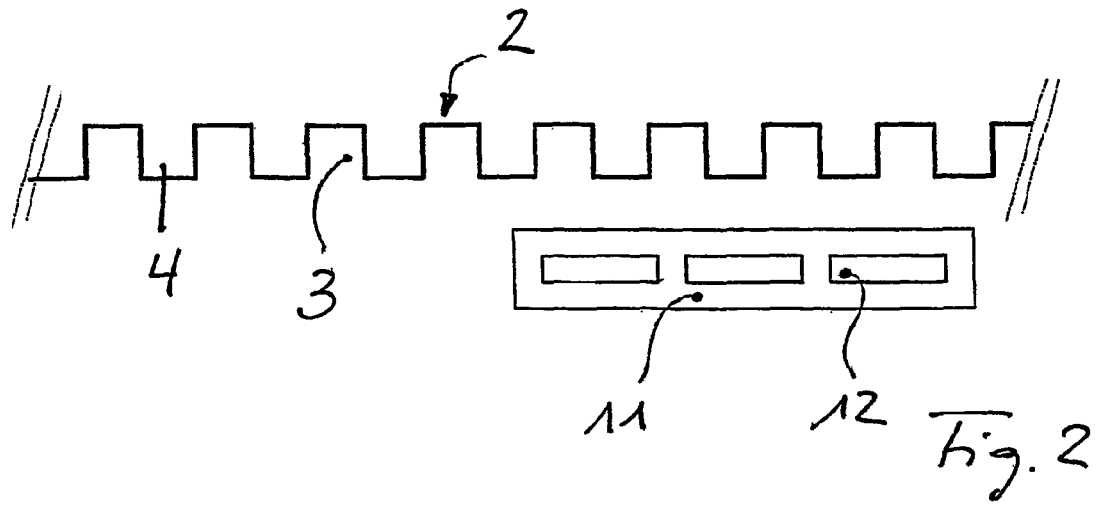
FIG. 2 shows an example of a position transmitter mounted at the guideway for relative and absolute location data.

To determine the relevant vehicle position, an information transmitter (indicator) 11 in form of a longitudinal strip is mounted, for example, along the guideway 1. The information transmitter 11 preferably takes a defined position in relation to the long-stator 2 and/or to the grooves 3 and teeth 4 thereof in order to obtain an unambiguous assignment for the determination of the locations of the poles in an actually known manner. The information transmitter 11 is provided with location data which for example may be comprised of slot combinations, preferably in a binary-code form. Alternatively, the location data may also consist of electrically conductive layers 12 on a strip which is entirely made of an electrically insulating material as indicated in FIG. 1 and FIG. 2. For example, the location data are provided every 200 m and so encoded that every individual location information is clearly assigned to an absolute position of the vehicle 9 along the guideway 1.

FIG. 1 moreover schematically shows, for example, an inductive sensor 14 which contains a high-frequency transmitting element 15 mounted on one side of the information transmitter 11 and a receiving element 16 mounted on the other side of the position transmitter 11 in order to identify the layers 12 following in alternating succession as well as the gaps between them. Devices of the kind described hereinabove are widely known from the printed publications mentioned before, e.g. DE 33 03 961 C2, which for avoidance of repetitions are hereby made a part of the present disclosure by reference thereto.

The grooves 3 (FIG. 2) existing anyway serve e.g. to determine a relative location data. To this effect, the vehicle 9 comprises another sensor 17 (FIG. 1) which for simplifying the representation is shown besides the long-stator 2, but actually lies directly under it as viewed in FIG. 1 and which for example is arranged upstream to or downstream of a carrying magnet 6. The signal being characteristic for the relative location (position) information, is e.g. furnished by an electronic counter coupled to a sensor 17, which is known for example from the printed publication DE 31 48 007 C2, which hereby is also made a part of the present disclosure by reference to it.

Figure 3:
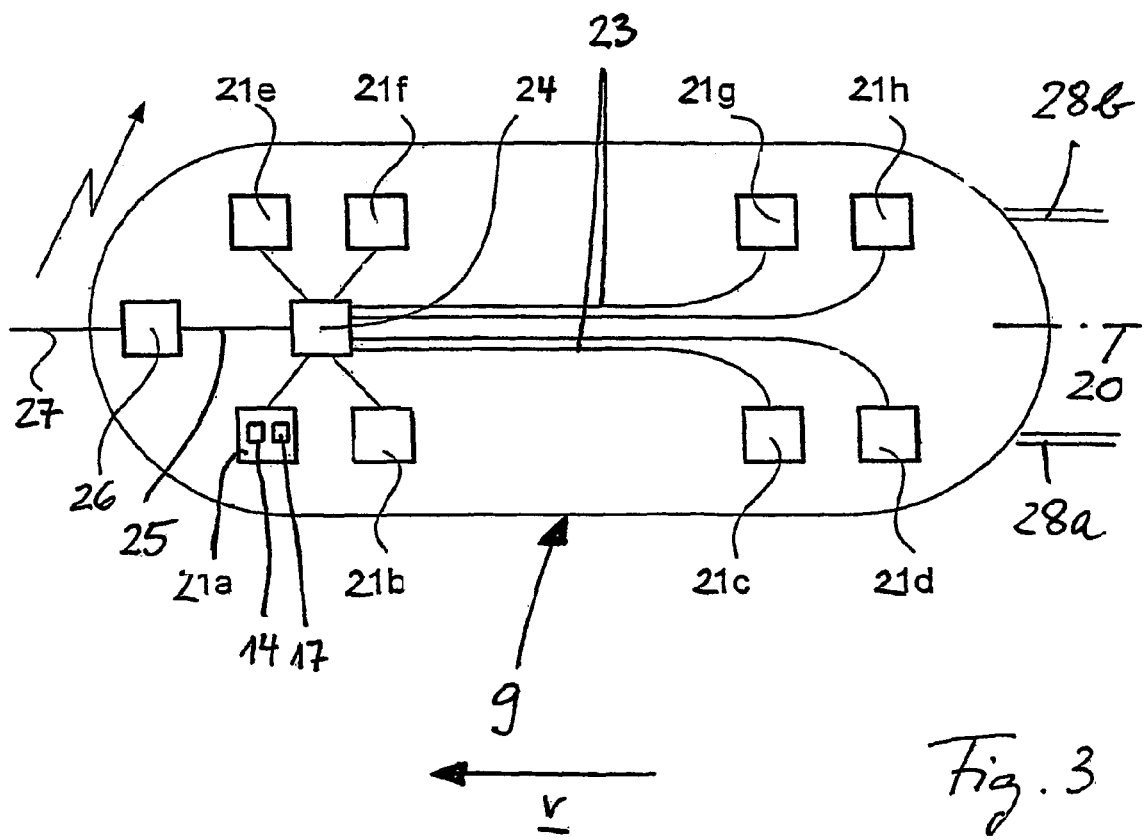
FIG. 3 schematically shows a top view onto the vehicle according to FIG. 1 and a device according to the present invention accommodated therein.

Schematically shown on FIG. 3 is a top view on the magnetic levitation vehicle 9 which can run in parallel to a longitudinal axis 20 on the guideway 1. Mounted in and/or at the vehicle 9 are eight location (position) data acquisition units 21a to 21h, with each data acquisition unit 21a to 21h containing one sensor 14 each for the absolute location data and one sensor 17 for the relative location data, as is schematically indicated on FIG. 4 for the location data acquisition unit 21a. All of these eight data acquisition units 21 are connected via electrical lines 23 to an evaluating unit 24 which comprises an output 25 at which reliable position signals are issued which exactly correspond to the momentary location (position) of the vehicle 19, as is explained further below. Preferably connected to the output 25 is an actually known radio transmission unit 26 (e.g. ZEVrail Glasers Annalen, special edition Transrapid, October 2003, pages 88 to 94) which comprises an antenna 27 through which the safe position signals are passed on to a central master control station or the like from where the operation of the vehicle 9 is controlled.

The data and information furnished by the location data acquisition units 21 are logically linked to each other in the evaluating device 24. It is tolerated thereby that one of the two sensors 14, 17 within each data acquisition unit 21 may be defective. This means that the information delivered by the data acquisition units 21 are regarded as correct data if only one of the two sensors 14, 17 issues a location signal. If none of the sensors 14, 17 issues a signal or if the signals of sensors belonging together deviate from each other, which can be detected by a simple comparison, the relevant data acquisition unit 21 is regarded as a defective unit.

Further it is assumed that relative and absolute location (position) data continuously exist at the right and left side of the guideway 1, as is generally indicated on FIG. 3 by reference numerals 28a and 28b.

To warrant a safe location identification even in view of possible interferences, two location data acquisition units 21 each are preferably provided according to the present invention on each side of the vehicle, i.e. on either side of the longitudinal axis 20, and both in the front and in the rear area. When traveling in the direction of an arrow v, for example, the location data acquisition units 21a, 21b are arranged on the left side at the front area, while the location data acquisition units 21c, 21d are located on the left side of the rear area, and the location data acquisition units 21e, 21f and/or 21g, 21h are accordingly mounted on the right side. Mounting these units in the front and/or rear area is deemed expedient because the space available in the middle section of the vehicle 9 is too small due to the carrying, guiding, and braking magnets provided there. The signals supplied by the data acquisition units 21 are therefore converted by computation to signals of a middle section of the vehicle.

For example, the following situations are to be considered as cases of disturbance or interference:

a) An unusual interference may exist, for example, because of falling rocks, sabotage or the like. In this case, the data acquisition units, particularly those mounted in the front area, i.e. 21a, 21b, and 21e, 21f, are jeopardized, while the rear-mounted data acquisition units are largely protected from objects or the like lying on the guideway by the vehicle body lying in front of them. When traveling in reverse direction, the same applies to those pairs of data acquisition units lying at the front and/or rear area.

b) Each data acquisition unit 21 may fail to work because of a technical defect. This applies to both the sensors 14 and to the sensors 17.

c) A failure situation may occur if one or several absolute location data do not exist any longer. A cause for this might be a deliberate destruction at least of parts of the information transmitters 11. If individual location markings or the like mounted at the guideway rather than a continuous strip are provided, these markings also might not be existing any longer, for example because of a deficient fixing.

To allow for a safe location determination despite these possible interferences as outlined hereinabove, the evaluation device 24 according to the present invention is configured as follows:

1.) As long as only one or two data acquisition units 21 fail to work, a safe location identification is not impeded, because a sufficient number of other location data acquisition units is available. By comparing their output signals, it can moreover be checked whether the remaining sensors work properly.

2.) If for example both the relative and absolute location data 28a on the left vehicle side fail to work, then the data acquisition units 21a to 21d on this side issue no signals identifying the location. However, a safe location determination is possible as long as the four other data acquisition units 21e to 21h work properly. This case is schematically represented in the first line of the table on FIG. 4.

3.) The same situation as the one shown under 2.) may occur on the right side of the vehicle, as shown by the second line on FIG. 4 for the failure of the location information 28b.

4.) In the cases 2.) and 3.), a data acquisition unit on the right and/or left side may additionally fail to work, for example the location data acquisition unit 21e or the location data acquisition unit 21d. Since three location data acquisition units still supply their signals to the evaluation unit 24, a safe location identification is possible, as shown by the third and sixth line on FIG. 4.

5.) A safe location determination is still possible even if the location information 28a, 28b on the right side or the left side fail to work and if additionally two location acquisition units on the right or left side are defective (e.g. 21e, 21f and/or 21c, 21d). This becomes evident from the fourth and seventh line on FIG. 4.

In case of the latter interference, there are only two location data acquisition units available. According to the present invention, the output signals of the two remaining location data acquisition units (e.g. 21g, 21h in the fourth line of FIG. 4) are again subjected to a comparison for this case. If both data acquisition units furnish matching location data, the location determination is regarded as being correct and a reliable position signal is issued at output 25. However, if the comparison ends up with different signals, then a fault signal is issued at output 25 in order to initiate a stopping of the vehicle 9, because for this case it cannot be safely decided whether the remaining data acquisition units supplying location data work correctly or whether they issue a location signal only accidentally, for example.

6.) A situation corresponding to the interference as per 5.) may occur, for example, if all the location data acquisition units 21a, 21b, 21e, 21f, in the front area and additionally two location data acquisition units (e.g. 21c, 21g, or 21c, 21d) in the rear area fail to work. Nevertheless, a safe location identification is possible here, too.

7.) Finally, in the fifth and eighth line of FIG. 4, a case is depicted which does not allow a safe location determination because only one data acquisition unit 21a and/or 21h supplies a location information. In this case, there is no second data acquisition unit available by means of which it could be examined through a comparison whether this location information is safe or not. In this case, a fault signal causing a stoppage of the vehicle 18 is precautionarily issued at output 25.

The device described comprises a total of eight data acquisition units 21 with two different sensors 14, 17 each and, therefore, offers high redundancy. Depending on a given case, however, it would also be possible to provide more or less data acquisition units and/or information transmitters. In principle, very reliable status signals are already obtained at the output 25 (FIG. 3) through a linkage of redundant information, if more than two data acquisition units exist which cooperate with two information transmitters and comprise only one sensor 14 and/or 17 each, without necessitating a stoppage of the vehicle on occurrence of a disturbance in one data acquisition unit or one information transmitter.

What is applicable in accordance with the above mentioned description to reliable position signals is accordingly applicable to other status signals, too, e.g. to speed or direction signals. In this connection it is irrelevant whether these other status signals are derived from the described location data or are generated by other means, for example by assigning to them separate information transmitters along the guideway.

Although the evaluation unit 24 can be mounted inside the vehicle 9 and thus at a safe and secure location, it is recommendable to provide redundancy for it, too. For example, this can be achieved by applying two identical evaluation units and/or one evaluation unit composed of two identical computer systems and by connecting them with the same data acquisition units 21a to 21h. Accordingly, a safe status signal is only issued via the antenna 27 if the output signals of both evaluation units or computer systems are identical. It would also be possible to provide the computer systems and/or evaluation units in a different configuration in terms of their hardware and/or software.

The invention is not limited to the described embodiment that can be diversified in a plurality of ways. For example, this applies to the configuration of the information transmitters 11 and 2 which are just mentioned to serve as an example, for which even other components with different codings can be utilized. Even the arrangement of the data acquisition units in or at the vehicle 9 can largely be chosen at will. Furthermore, it is self-evident that the described device can also be utilized and implemented in other traffic systems, e.g. railways, by utilizing or at least taking recourse to the track structure in these systems, for example, for the supply of data and information. Finally it is self-explanatory that the different features can also be applied in combinations other than those described and shown hereinabove.

The invention claimed is:

1. A device for generating safe status signals of a vehicle (9) that is movable along a given guideway (1), comprising:
    data transmitters (2, 11) stationarily disposed along said guideway (1) and provided with data;
    data acquisition units (21) mounted on the vehicle (9) and used for scanning the data transmitters (2, 11) and for supplying data signals; and
    an evaluation device (24) connected to said data acquisition units (21) for evaluating the data signals, at least two of the data acquisition units (21) are connected to the evaluation device (24), wherein the evaluation device (24) has an output (25) for delivering safe status signals when and as long as at least two data acquisition units (21) supply matching data, and wherein the data transmitters (2) comprise second position transmitters provided with relative location data (3).

2. A device according to claim 1, wherein at least two stationary disposed data transmitters (2, 11) are mounted at the guideway (1) and that the vehicle (9) comprises at least four data acquisition units (21) assigned in pairs to said data transmitters (2, 11).

3. A device according to claim 1, wherein the evaluation device (24) comprises of at least two computer systems connected to the same data acquisition units (21) and that a status signal is only issued if both computer systems supply matching location data.

4. A device according to claim 1, wherein the data transmitters (11) are comprised of position transmitters provided with binary-code location data.

5. A device according to claim 3, wherein the two computer systems are differently configured in terms of their hardware and/or software.

6. A device according to claim 1, wherein the second information transmitters (2) are comprised of long-stators of long-stator linear motors for driving said vehicle (9), said long-stators being comprised of grooves (3) and teeth (4) and disposed along said guideway (1).

7. A device according to claim 1, wherein the data acquisition unit (21) is comprised at least of one first sensor (14) for the absolute location data and of a second sensor (17) for the relative location data.

8. A device according to claim 7, wherein the evaluation device (24) is so configured that it evaluates those location data as correct that are issued by the relevant other sensor (17 and/or 14) of the same data acquisition unit (21) if one of the two sensors (14, 17) of said data acquisition unit (21) fails to work.

9. A device according to claim 1, wherein the evaluating device (24) is configured for supplying safe location, speed and/or direction signals for said vehicle (9).

10. A device according to claim 9, wherein the evaluation device (24) is so configured that the safe speed and direction signals can be derived from the relative location data.

11. A device according to claim 1, wherein at least eight data acquisition units (21) are provided on the vehicle (9) which are arranged in pairs at the front and rear area and on the right and left side each of the vehicle.

12. A device according to claim 2, wherein the evaluating device (24) is so configured that the reliable status signals are only generated if a majority of the data acquisition units (21) supplies matching data signals.

* * * * *